United States Patent
Bechelany et al.

(10) Patent No.: US 11,752,541 B2
(45) Date of Patent: Sep. 12, 2023

(54) CERAMIC COATING FOR FOUNDRY CORE

(71) Applicant: COMMISSARIAT A L'ENERGIE ATOMIQUE ET AUX ENERGIES ALTERNATIVES, Paris (FR)

(72) Inventors: Mirna Bechelany, Moissy-Cramayel (FR); Virginie Jaquet, Moissy-Cramayel (FR); Amar Saboundji, Moissy-Cramayel (FR); Mathieu Soulier, Saint Jean de Moirans (FR); Mathieu Boidot, Gieres (FR); Richard Laucournet, La Buisse (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 79 days.

(21) Appl. No.: 17/266,020

(22) PCT Filed: Aug. 7, 2019

(86) PCT No.: PCT/FR2019/051917
§ 371 (c)(1),
(2) Date: Feb. 4, 2021

(87) PCT Pub. No.: WO2020/030881
PCT Pub. Date: Feb. 13, 2020

(65) Prior Publication Data
US 2021/0299743 A1 Sep. 30, 2021

(30) Foreign Application Priority Data

Aug. 7, 2018 (FR) ...................... 18 00850

(51) Int. Cl.
B22C 9/12 (2006.01)
B22C 3/00 (2006.01)
(Continued)

(52) U.S. Cl.
CPC .................. *B22C 9/12* (2013.01); *B22C 3/00* (2013.01); *B22C 9/10* (2013.01); *C04B 35/5603* (2013.01);
(Continued)

(58) Field of Classification Search
CPC .... B22C 1/00; B22C 3/00; B22C 9/10; B22C 9/12
(Continued)

(56) References Cited

U.S. PATENT DOCUMENTS 5,635,250 A   6/1997   Blum et al.
8,101,272 B1 *   1/2012   Schmidt ................ C04B 35/573
                                                  428/297.4
(Continued)

FOREIGN PATENT DOCUMENTS

FR   3 060 600 A1   6/2018
WO   2007/089666 A2   8/2007
WO   2018/071287 A1   4/2018

OTHER PUBLICATIONS

International Search Report dated Sep. 20, 2019 in Application No. PCT/FR2019/051917.
(Continued)

*Primary Examiner* — Kevin P Kerns
(74) *Attorney, Agent, or Firm* — Sughrue Mion, PLLC (57) ABSTRACT

A process for coating a refractory alloy part is provided and includes coating an area of a refractory alloy part by means of a treatment composition including a type of preceramic polymer and a solvent, and heat treating the part coated with the treatment composition. The heat treating partially con-
(Continued)

verts the preceramic polymer and forms a ceramic coating obtained by conversion, the ceramic coating protecting the refractory alloy from oxidation. The treatment composition also includes active fillers to form an alloy coating on a surface of the part by solid diffusion in addition to the ceramic coating obtained by conversion, and the alloy coating generates a protective oxide layer when subjected to oxidizing conditions.

14 Claims, 2 Drawing Sheets

(51) Int. Cl.
| | | |
|---|---|---|
| *B22C 9/10* | (2006.01) | |
| *C04B 35/56* | (2006.01) | |
| *C09D 4/00* | (2006.01) | |
| *C04B 111/00* | (2006.01) | |

(52) U.S. Cl.
CPC ...... *C09D 4/00* (2013.01); *C04B 2111/00568* (2013.01)

(58) Field of Classification Search
USPC ................................................ 164/6, 14, 33
See application file for complete search history.

(56) References Cited

U.S. PATENT DOCUMENTS

2005/0230078 A1  10/2005  Snyder et al.
2007/0235158 A1  10/2007  Bochiechio et al.

OTHER PUBLICATIONS

French Search Report dated Mar. 19, 2019 in Application No. 1800850.

\* cited by examiner

CERAMIC COATING FOR FOUNDRY CORE

CROSS REFERENCE TO RELATED APPLICATIONS

This application is a National Stage of International Application No. PCT/FR2019/051917 filed Aug. 7, 2019, claiming priority based on French Patent Application No. 18 00850 filed Aug. 7, 2018, the entire contents of each of which being herein incorporated by reference in their entireties.

GENERAL TECHNICAL FIELD AND PRIOR ART

The invention relates to the field of protective coatings for mechanical parts, more precisely coatings for foundry cores.

During a foundry manufacturing process, cores are conventionally arranged in foundry molds, prior to the injection of the liquid metal, so as to create one or more cavities or recesses in the parts that will be made during the manufacturing process.

These cores are conventionally made of refractory ceramics.

Alternatively, it is known to use foundry cores made of refractory alloys to replace or complement the ceramic cores conventionally used.

These refractory alloy materials, typically molybdenum alloys, must be coated with a protective layer to preserve their mechanical characteristics, in particular in the presence of very high temperatures encountered for example during the manufacturing process of superalloy blades for gas turbines.

In the case of investment casting processes, shells made of refractory material are made around a wax model of the part to be made, so as to form a mold of the model of the part. The shell is then heated to be consolidated, the wax being evacuated beforehand in an autoclave under steam to produce an impression of the external shape of the part to be made.

A core can be initially placed in the wax model and present before the casting of the material constituting the part to be made, the core defining the internal shape of the part.

In the case of the production of gas turbine blades, typically superalloy turbine blades in investment casting, the consolidation of the blade shell is carried out under air at a temperature greater than 1000° C., significant oxidation phenomena may be encountered, in particular for the refractory metal which constitutes part of the core or the complete core.

Indeed, molybdenum for example, which can be used as an insert in a ceramic core or can constitute the entire core, reacts, when uncoated, with oxygen from 400° C. to form molybdenum dioxide ($MoO_2$) up to 650° C. and then molybdenum trioxide above 650° C., molybdenum trioxide being highly volatile. The oxidation rate of molybdenum follows in a known manner a linear increase between 400 and 650° C. and an exponential increase beyond that up to 1700° C.

Alternatively, it is known to use a molybdenum-based alloy containing zirconium and titanium (TZM alloy), which is more easily machinable and has a higher mechanical strength than molybdenum at room temperature. TZM is known to oxidize from 540° C. and oxidation becomes exponential from 790° C. with rapid volatilization of the TZM substrate (in the field of surface coatings, the substrate is the material composing the part to be coated).

This very significant oxidation of molybdenum or TZM parts leads to a significant loss of mass and a rapid degradation of mechanical properties.

After air consolidation of the shell, the superalloy is melted and vacuum cast into the shell, thus coming into contact with the refractory alloy.

The casting step, carried out under vacuum at a temperature greater than 1500° C., leads in particular to phenomena of diffusion of superalloy elements into the refractory alloy of the core.

An interdiffusion of the refractory alloy elements from the core to the superalloy can lead to a modification of the mechanical properties of the superalloy, and thus to a degradation of the performance of the part obtained.

It is known to make preceramic polymer coatings for metal parts.

The "preceramic polymer" route is a synthesis method for manufacturing homogeneous ceramics of high chemical purity. Due to the control of the viscoelastic properties and the atomic scale composition of the polymers, it is in particular possible to generate ceramics in the desired shape and composition.

The best-known classes of ceramics obtained by this chemical route are the binary systems $Si_3N_4$, SiC, BN and AlN, the ternary systems SiCN, SiCO and BCN as well as the quaternary systems SiCNO, SiBCN, SiBCO, SiAlCN and SiAlCO.

The use of ceramic precursors or preceramic polymers for the production of protective coatings is encouraging since, compared with conventional techniques, this route is carried out at lower temperatures and without sintering additives. Preceramic polymers are understood to be polymers which after pyrolysis are converted to ceramic.

Figure 1:
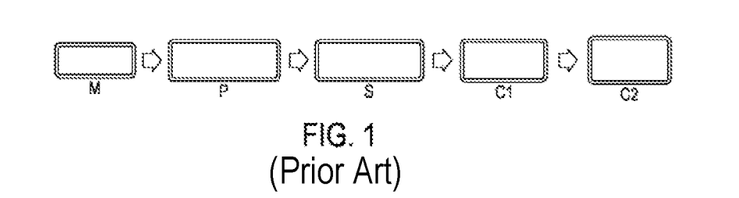
FIG. 1 is a schematic representation of the steps of coating by means of a preceramic polymer according to the prior art.

The process for forming a coating by means of a preceramic polymer, shown in FIG. 1, consists of four steps:

1) Synthesis of a molecular precursor, or monomer M.

2) Conversion of the molecular precursor to an inorganic polymer P of controlled chemical composition and architecture, by performing a polymerization step. This polymer is designed to be formable (i.e., The inorganic polymer is preferentially constituted of the basic network of the ceramic, hence its name preceramic.

Figure 2:
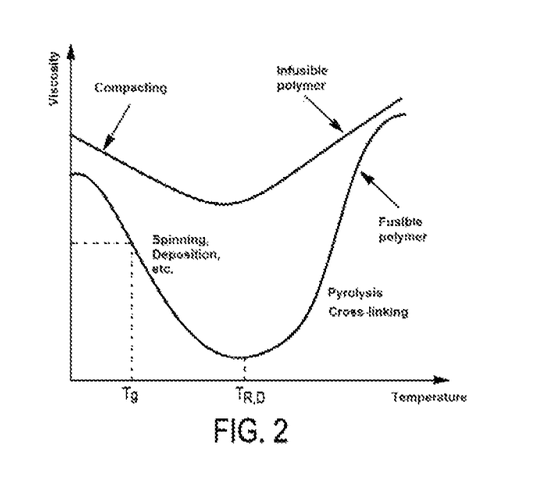
FIG. 2 is a diagram of the state of a preceramic polymer as a function of viscosity and temperature.

3) Shaping of the polymer by conventional techniques such as coating, infiltration, compacting etc. The physical and chemical properties of the preceramic polymer such as its solubility, rheology, degree of cross-linking and pyrolysis largely influence the way in which it can be shaped and transformed into a defined ceramic shape. The deposition of coatings is possible in a temperature range where an adequate viscosity is reached but without cross-linking and decomposition phenomena ($T<T_{R,D}$ (cross-linking and decomposition temperature)), as shown in FIG. 2.

4) Step of cross-linking the shaped polymer which leads to the obtaining of an infusible solid S whose shape is able to withstand the subsequent steps of heat and chemical treatment.

5) Step of ceramization of the infusible product by high-temperature heat (and optionally chemical) treatments. In this step carried out by means of a pyrolysis step, a mineralization phase can be distinguished in which the solid is transformed into an inorganic mineral C1, a (three-dimensional) network of covalent bonds, of desired chemical composition, then a crystallization phase in which the mineral, amorphous, is progressively organized into a polycrystalline ceramic C2 during a crystallization step.

Preceramic coatings are made by coating a part with a preceramic polymer.

The coated part is then subjected to a heat treatment that converts the preceramic polymer to ceramic.

Due to the marked difference in density between polymers (from 1 to 1.2 g·cm$^{-1}$) and ceramic materials (2-3 g·cm$^{-1}$), a linear shrinkage of more than 30% generally leads to extensive cracking and high porosity in the ceramic coating. The appearance of cracks in the coating is particularly detrimental to its effectiveness. In particular, any through-crack in the coating brings the refractory alloy substrate into contact with the oxidizing atmosphere and renders the oxidation protection of the coating null and void.

To overcome this problem, a modification process called active-filler-controlled polymer pyrolysis (AFCOP) was developed by Greil. Reference can be made to the following publication: *Active-Filler-Controlled Pyrolysis of Preceramic Polymers*, P. Greil, J. Am. Ceram. Soc. 1995. 78: pp. 835-48. According to this method, the polymer is partially filled with inert or active powder particles, generally in the range of 30-50% by volume, to reduce shrinkage and to allow the production of quality ceramic parts. Active fillers such as Ti, Nb, Cr, Mo, B, MoSi$_2$ incorporated into the polymer can reduce the shrinkage caused during the conversion of the polymer to ceramic by reacting with the solid and gaseous decomposition products of the polymer precursor and/or the pyrolysis atmosphere to form carbides, oxides, nitrides or silicides. This reaction can in fact occur with an expansion of the filler particles, which neutralizes shrinkage during densification, and leads to a ceramic composite as close as possible to its final shape.

GENERAL PRESENTATION OF THE INVENTION

One aim of the invention is to limit oxidation and inter-diffusion phenomena during the heat treatment of refractory alloys, in particular in the presence of a superalloy for gas turbines.

Another aim of the invention is to allow the use of molybdenum or TZM at temperature and under air for all types of applications.

Another aim of the invention is to prevent the appearance of cracks in the protective coating.

Another aim is to create a coating that adheres to the surface of the substrate used.

Another aim of the invention is to propose a solution that adapts to any type of geometry.

Another aim of the invention is to propose an easily achievable solution, with the aim of limiting costs and maximizing production volumes.

To this end, the invention proposes a process for coating a refractory alloy part, comprising the steps of:
  Coating at least one area of the part by means of a treatment composition, the treatment composition comprising at least one type of preceramic polymer and a solvent,
  Heat treating the coated part of the treatment composition, the heat treatment being configured to at least partially convert the preceramic polymer to ceramic and form a coating, the coating being configured to protect the refractory alloy from oxidation
  and wherein the treatment composition also comprises so-called active fillers configured to form an alloy on the surface of the part by solid diffusion in addition to the ceramic obtained by conversion, the alloy being configured to generate a protective oxide layer when subjected to oxidizing conditions.

The invention can be advantageously complemented by the following features, taken alone or in combination:
  the ceramic coating obtained by conversion is removed by mechanical or chemical action to leave only the alloy coating formed by solid diffusion; in this configuration, the final coating contains only the alloy layer formed by solid diffusion of the active filler(s) in the part during the conversion heat treatment; the preceramic polymer(s) in the treatment composition then act(s) as a vehicle for the active fillers incorporated in the treatment composition; the very good temperature resistance of the preceramic polymers (up to 1350° C.) ensures contact of the active fillers on the surface of the part and allows solid diffusion over a wide temperature range (200-1350° C.);
  the treatment composition also comprises so-called passive fillers configured to modulate the coefficient of expansion of the coating so as to have a difference between the coefficient of expansion of a substrate and the coefficient of expansion of the coating of less than $3*10^{-6}K^{-1}$;
  the process comprises at least a first and a second consecutive coating step, and at least one cross-linking step carried out between two consecutive coating steps, the cross-linking step being configured to generate an infusible polymer network capable of supporting subsequent pyrolysis steps, the second coating step being applied to obtain a thicker layer;
  the treatment composition used during the second coating step has a viscosity lower than the viscosity of the treatment composition used in the first coating step;
  the cross-linking step is carried out in the presence of air at a temperature greater than or equal to the highest cross-linking temperature among the different cross-linking temperatures of the different species of preceramic polymer in the treatment solution;
  the refractory alloy comprises molybdenum, and wherein the coating is configured to protect the refractory alloy from diffusion phenomena;
  The heat treatment step comprises the steps of:
    Cross-linking at a first temperature configured to evaporate the solvent and accelerate cross-linking,
    Conversion carried out at a second temperature configured to convert the polymer to ceramic and remove organic species, so as to obtain a ceramic having an amorphous structure,
    Structuring carried out at a third temperature, configured to convert the ceramic of amorphous structure to ceramic having a crystalline structure;
  the heat treatment step is carried out under controlled atmosphere in order to avoid oxidation of the foundry core while having sufficient oxygen partial pressure to ensure conversion of the preceramic polymer to oxycarbide ceramic or oxide ceramic;
  the process comprises one or more coating steps and a ceramization step carried out between two consecutive coating steps (3), the coating step being configured to fill/heal defects and porosity that may be generated by the ceramization step;
  the treatment composition comprises, based on the total mass of the treatment composition:
    A mass proportion comprised between 45% and 70% of a solvent,
    A mass proportion comprised between 15% and 40% of a preceramic polymer,
    A mass proportion comprised between 10% and 30% of a passive filler;

the treatment composition comprises, based on the total mass of the treatment composition:

A mass proportion comprised between 30% and 70% of a solvent,

A mass proportion comprised between 15% and 40% of a polysiloxane preceramic polymer, having a theoretical conversion rate from ceramic to silicon dioxide, A mass proportion comprised between 15% and 60% of aluminum with a grain size of less than 20 microns;

According to another aspect, the invention relates to a mechanical part made of a refractory alloy comprising a coating made by a coating process according to the invention.

Optionally, the part is a refractory alloy foundry core.

PRESENTATION OF THE FIGURES

Other features and advantages of the invention will further emerge from the following description, which is purely illustrative and non-limiting, and should be read in conjunction with the appended figures wherein:

FIG. 4a and FIG. 4b are schematic representations of a coating device conforming to the invention; more precisely FIG. 4a represents a coating device.

DESCRIPTION OF ONE OR MORE METHODS OF IMPLEMENTATION AND EMBODIMENTS

The invention can be applied to any type of part, in particular made of molybdenum or a refractory alloy, comprising as the majority element molybdenum, for example the titanium-zirconium-molybdenum (TZM) alloy, subject to oxidation conditions, in particular in the presence of high temperatures (above 400° C.) and air.

Figure 3:
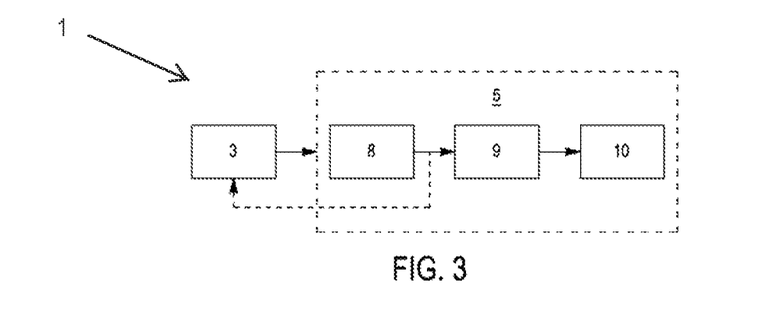
FIG. 3 is a block diagram type representation of the steps of a process for coating a part conforming to the invention.

The invention applies to a process 1 for coating a refractory alloy part 2, comprising the steps of:

a. Coating 3 at least one area of the part 2 with a treatment composition 4, the treatment composition 4 comprising a preceramic polymer and a solvent, b. Heat treating 5 the part 2 coated with treatment composition 4, the heat treatment 5 being configured to convert the preceramic polymer to ceramic and form a coating 6 covering a substrate 7, the coating 6 being configured to protect the substrate 7 from oxidation and diffusion.

The part 2 is thus at least partially covered with a coating 6 configured to protect it from the oxidation that can occur in particular during the various casting processes required to manufacture a turbine blade, and of which certain steps (ceramic core firing/shell firing) are carried out at high temperature and in the presence of air.

The invention can advantageously be applied to a refractory alloy foundry core for the production of a superalloy gas turbine blade.

Coating

The coating 6 can be carried out following a process 1 comprising one or more coating steps 3, which can be carried out by the same or different methods.

The choice of the coating method depends on the properties of the treatment composition 4, in particular the composition of said solution, its viscosity during the coating step 3, and the atmosphere in which the part 2 will be during the heat treatment step 5.

Certain parameters of the part 2 also influence the choice of coating method, in particular the size of the part 2, the complexity of its geometry, and the surface finish of the part 2 during the coating step 3.

In addition, the desired layer thickness influences the choice of coating method.

For example, centrifugal deposition produces a thin homogeneous layer on a flat surface of a part 2.

The layer thickness can be adjusted by changing the rotation speed of the part 2.

To produce a thick layer, it is also possible to adapt the viscosity of the treatment composition 4, in addition to reducing the rotation speed of the part 2.

Alternatively, for complex geometries, the coating step 3 can be carried out by dipping, the part being dipped in a bath of treatment composition 4, so as to cover the entire surface of the part with a layer of treatment composition 4.

Figure 4A:
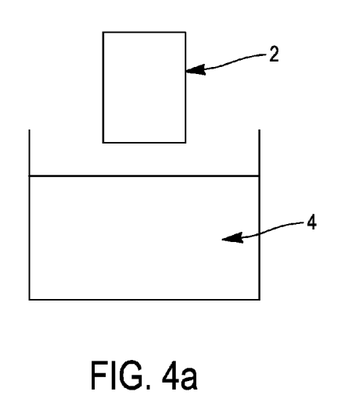

Alternatively, the coating step 3 can be carried out by spraying. A spraying device locally sprays a treatment composition 4 onto an area of the part to be treated, so as to cover the area with a layer of treatment composition 4.

Spraying is advantageously applied to parts with complex geometries, in particular when it is not necessary or is not desired to apply a coating 6 over the entire surface of the part 2.

Dip or spray coating methods are also suitable for parts with a simple geometry.

Treatment Composition

The treatment composition 4 may comprise preceramic polymer suspended in a solvent.

The preceramic polymer advantageously comprises polysiloxanes with a high ceramization efficiency that convert to silica ($SiO_2$) or silicon oxycarbide (Si—O—C) by thermolysis but can also be polysilazanes or polycarbosilanes. High ceramization efficiency means that the theoretical conversion rate of ceramic to silicon dioxide $SiO_2$ or silicon oxycarbide Si—O—C is at least 70% by mass, preferentially at least 80%.

Mention may be made, for example and preferentially, of the commercially available siloxanes SILRES® from the firm Wacker.

Optionally, the solvent used is organic, and may comprise for example one or a combination of a selection of solvents from glycol ethers, terpineol, butanone, methyl ethyl ketone (MEK), acetone, benzene, xylene, toluene or other organic solvents not listed above.

It is possible to adapt the viscosity of the treatment composition 4 by changing the type of solvent used, or the proportion of solvent in the treatment composition 4.

Depending on the amount and type of solvent, the thickness of the coating layer 6 derived from the preceramic polymer applied during a coating phase 3 can vary between 0.1 and 50 μm.

Thus, the thickness of the coating layer 6 is less than a critical thickness below which the coating 6 remains intact and adheres to the substrate 7, and above which cracking and delamination phenomena occur during the heat treatment step 5.

Multiple Layers

To obtain thick coatings without defects up to a thickness of several hundred microns, it is possible to carry out several successive coating steps 3, producing a plurality of layers deposited with or without intermediate heat treatment.

The viscosity of the treatment composition 4 will be advantageously reduced at each iteration of coating 3 in order to fill the porosity of the preceding layer.

Between each coating 3 pass, a cross-linking step 8 of the coating can advantageously be carried out.

During the cross-linking step 8, the part 2 is heated in the presence of air to a cross-linking temperature (100 to 200° C.) of the preceramic polymer(s) contained in the treatment composition 4.

If the preceramic polymers used have a different cross-linking temperature, cross-linking 8 will be carried out at the highest cross-linking temperature among the cross-linking temperatures of the species present.

The coating of a part 2 is carried out with as many coating 3 passes necessary to obtain a covering coating 6.

So-Called "Filler" Particles.

In order to form a dense coating free of through-cracks that would bring the metal into contact with the oxidizing atmosphere, so-called "filler" particles can be added to the treatment composition 4.

In particular, the fillers are used to prevent significant shrinkage during ceramization and to adjust the properties of the coating 6 with respect to the substrate 7.

The treatment composition 4 can therefore comprise one or more so-called active or passive fillers.

A passive filler is used to prevent excessive shrinkage caused by ceramization during the heat treatment 5.

Passive fillers also modulate the coefficient of expansion of the coating 6 as a function of the properties of the substrate 7, in particular in order to avoid gradients in coefficients of thermal expansion at the interface between the coating 6 and the substrate 7. A difference in the coefficient of thermal expansion of less than $1*10^{-6}K^{-1}$ to $3*10^{-6}K^{-1}$ between the substrate 7 and the coating 6 prevents delamination and cracking during heat treatments.

Indeed, a sudden change in the coefficient of thermal expansion can cause delamination or disbonding of the coating 6 during large heat variations.

Optionally, but advantageously in the case where the part 2 is a refractory alloy foundry core, the passive filler(s) comprise(s) ceramic fillers derived partly or wholly from the composition of the ceramic cores conventionally used, for example zirconia, alumina or silica, but also other oxides, for example aluminosilicates, calcite, magnesia, or other species not listed or a mixture thereof. Examples of ceramic compositions can be found in the U.S. Pat. No. 5,043,014.

Thus, during the demolding of a foundry product, the stripping of the foundry cores can be simplified.

Indeed, a ceramic core dissolution operation, conventionally carried out by means of a basic solvent, also allows the dissolution of the preceramic polymer coating obtained for such a treatment composition 4, allowing the removal of the refractory alloy cores with no intermediate step.

An active filler is configured to react with the decomposition products of the preceramic polymer to prevent shrinkage and the substrate 7 to form an alloy configured to generate a protective oxide layer when the part 2 is exposed to an oxidizing environment.

The treatment composition 4 may comprise one or more metallic active fillers capable of forming by solid diffusion an alloy with the substrate 7 and this alloy is capable of generating a passivating oxide layer when subjected to oxidizing conditions.

More precisely, the metallic active fillers present in the treatment composition 4 will migrate by diffusion to the refractory alloy composing the part 2 during the heat treatment.

Said active fillers will then form an alloy with at least one of the refractory alloy species, the alloy being distributed in a layer located beneath the ceramic layer.

Thus, during the life cycle of the part 2, in the case where the ceramic layer has open porosities allowing oxygen to pass through or if the layer becomes chipped or cracked, the alloy formed is locally exposed to external conditions. When the environmental conditions are oxidizing, the alloy generates a passivating oxide layer on the surface capable of protecting the part against oxidation and diffusion of external species.

This healing effect therefore greatly increases the service life of the part 2.

The active metal fillers can advantageously contain one or a combination of several of the species listed below:
A silicon powder,
An aluminum powder,
An iron powder,
A copper powder,
A cobalt powder,
A nickel powder,
A lanthanum powder
A germanium powder,
A zirconium powder,
A chromium powder,
A titanium powder,
A hafnium powder,
A lanthanum powder,
A rhenium powder.

In order to obtain a homogeneous coating and to optimize the contact surface between the active fillers and the support 7 and to facilitate diffusion, the grain size of the active fillers will be chosen smaller than 20 microns. If necessary, grinding of the active fillers can be carried out to lower the grain size below this 20-micron threshold.

Alloys formed on the surface 6 by solid diffusion of the active fillers of the composition 4 into the support 7 are the thermodynamically stable compounds capable of forming. The possible alloys to be formed are defined by the phase diagrams between its active fillers and the support 7.

As an example, the composition of the treatment 4 could contain a silicon filler and a germanium filler which both form a solid solution in all proportions to form a $Si_x$—$Ge_{1-x}$ alloy by solid diffusion. The $Si_x$—$Ge_{1-x}$ alloy can react with the molybdenum-based support 7 to form the compound defined as $Mo(Si_xGe_{1-x})_2$. This phase is likely to form a passivation layer of silica in oxidizing condition.

As another example, the chromium and cobalt active fillers can be included in the composition of the treatment 4 in proportions adapted to form by solid diffusion in contact with the molybdenum-based support 7 a Co—Cr—Mo ternary alloy containing 26 to 30% by weight chromium and 5 to 7% by weight molybdenum (the balance being cobalt). This alloy exhibits excellent fatigue and corrosion resistance by forming a passivation layer of chromium (III) oxide, $Cr_2O_3$.

As another example, a titanium active filler can be included in the composition of the treatment 4 to form by solid diffusion with the support 7 a solid solution of titanium in molybdenum which can contain up to 20-22% molar titanium. If the titanium content in the layer is higher, the system becomes binary with a titanium-molybdenum solid solution to which a pure titanium phase is added at room temperature. The Ti—Mo solid solution, like the titanium phase if present, will form a layer of passivating oxide $TiO_2$ in oxidizing condition capable of limiting the oxidation of the support 7.

At least one of the compounds formed by solid diffusion between the active filler(s) and the substrate 7 must be capable of forming a passivating and covering layer on the surface of the part 2.

Thus, the silicon in the treatment composition 4 leads to the formation of a silicon-molybdenum $Mo_aSi_b$ phase, which will form a passivation layer of silica when exposed to oxidizing conditions. It is known that silica reacts strongly with the reactive elements of the superalloy (Al, Hf, Ti, etc.). The ceramic layer also formed above the silicide layer prevents any reactivity between the silica formed under oxidizing conditions during the core and shell firing with the superalloy. Thus, the silica layer provides protection against oxidation while the ceramic layer provides protection with respect to the superalloy.

The aluminum in the treatment composition 4 leads to the formation of a phase of an aluminum-molybdenum alloy $Mo_aAl_b$, which will form a passivation layer of alumina when exposed to oxidizing conditions.

The addition of aluminum and silicon in the treatment composition 4 leads to the formation of an aluminum-silicon-molybdenum alloy $Mo_aAl_bSi_c$ phase. The $Mo(Si, Al)_2$ phase in particular makes it possible to predominantly form alumina or silica under oxidizing conditions as a function of the respective aluminum and silicon contents.

The nickel in the treatment composition 4 leads to the formation of a nickel-molybdenum alloy $Mo_aNi_b$ phase which will form a passivation layer of nickel oxide when exposed to oxidizing conditions.

The chromium in the treatment composition 4 leads to the formation of a chromium-molybdenum alloy $Mo_aCr_b$ phase which will form a passivation layer of chrome (III) oxide when exposed to oxidizing conditions.

Similarly, the metallic active fillers listed above form an alloy with the molybdenum of the substrate 7, which generates a protective oxide layer on the surface of the part 2.

These metallic elements added in the treatment composition 4 can also be combined to form a $Mo_aX_bY_c$ ternary alloy coating, $Mo_aX_bY_cZ_d$ quaternary alloy coating (where X, Y and Z correspond to different chemical species, preferentially selected from the species listed above) or any other type of complex alloy.

It is therefore possible to coat complex forms of preceramic polymer with a controlled process cost.

Heat Treatment

The process for transforming preceramic polymers into ceramics is a complex approach. Several factors can vary and modify the composition, microstructure, density, ceramic yield and properties of ceramics derived from preceramic polymers. Among these factors:

Rheology, ceramic yield, reactivity and degree of cross-linking of the precursor Pyrolysis atmosphere (inert/reactive/vacuum) during shaping and/or during ceramization Gas pressure during ceramization Heating speed Heating temperature Plateau time Following the coating step 3, the preceramic polymer of the treatment composition 4 is converted by a heat treatment 5 to ceramic.

Figure 4B:
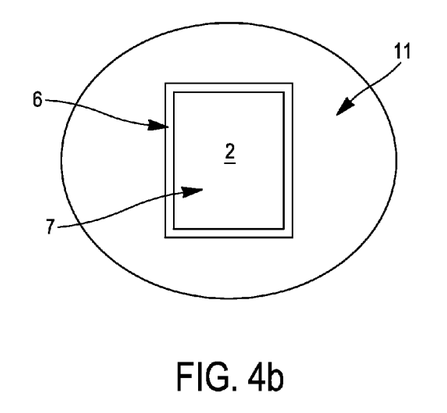
FIG. 4b represents a heat treatment device.

The part 2 is placed in a chamber 11 which is heated to the temperature required for the treatment.

Optionally, the chamber 11 is hermetically sealed and contains an inert gas for the substrate 7 or the treatment composition 4.

The heat treatment 5 of the preceramic polymer and the sintering of the ceramic filler are preferentially carried out in an atmosphere that is non-oxidizing for the part 2, but whose oxygen partial pressure is sufficient to convert the preceramic polymer to an oxycarbide ceramic or oxide ceramic. For example, the oxygen partial pressure range can be comprised between $10^{-15}$ bar and $10^{-3}$ bar for a pyrolysis treatment carried out at 1350° C.

The heat treatment 5 can consist of several steps.

A cross-linking step 8 is preferentially carried out after the coating step 3 and prior to any other heat treatment step 5.

The cross-linking step 8 in particular vaporizes the solvent and generates the cross-linking of the preceramic polymer. This cross-linking step produces a low content of organic groups which improves the ceramic yield and avoids too abrupt variations in density and volume during conversion.

This treatment is carried out between 100 and 400° C., preferentially at a temperature around 200° C.

Optionally, cross-linking can be induced by ultraviolet radiation.

A conversion step 9 is performed to convert the polymer to ceramic. This conversion leads to the decomposition and removal of organic fractions (i.e., methyl, ethyl, phenyl or vinyl) and Si—H or Si—NHx groups during treatment.

The conversion step 9 is preferentially carried out at a temperature comprised between 600 and 800° C.

After the conversion step 9 an amorphous structure is obtained.

Following the conversion step 9, a structuring step 10 is carried out, at a temperature configured to define the final crystal structure, the microstructure and the properties of the coating 6.

Preferentially, the structuring step 10 is carried out at a temperature comprised between 1000° C. and 1350° C.

Different treatment techniques can be used to carry out one or more steps of the heat treatment 5.

Laser-induced pyrolysis is advantageously used for substrates with a low melting temperature, and to generate ceramic deposits with specific compositions.

Ion beam treatment is advantageously used to control the breaking of chemical bonds and the cross-linking of the preceramic polymer.

The heat treatment 5 of the coated part 2 (molybdenum or molybdenum alloy) is configured to ensure the conversion to ceramic of all or part of the preceramic polymer contained in the coating 6, and to allow the sintering of the ceramic filler present in the coating 6 in order to obtain a dense deposit (relative density>80%).

Example Embodiment of a Coating

An example of the treatment composition 4 for dip coating 3 comprises:

A mass proportion comprised between 45% and 70% of Terpineol solvent, preferentially between 50% and 65%, for example 53%, A mass proportion comprised between 15% and 40% of SILRES MK® (polysiloxane preceramic polymer, having a theoretical conversion rate of ceramic to silicon dioxide $SiO_2$ or to silicon oxycarbide Si—O—C of 80% by mass), preferentially between 20% and 35%, for example 27%, A mass proportion comprised between 10% and 30% of fine silica (fine is understood to mean for example that 10% of the grains have a diameter less than 3 microns, 50% of the grains have a diameter less than 11 microns, and 10% of the grains have a diameter greater than 38 microns), preferentially between 15% and 25%, for example 20%.

In a first step the dissolution of the preceramic polymer in Terpineol is carried out at 60° C. under magnetic stirring in a beaker for at least 30 minutes. The fine silica powder is then added and stirring is maintained for at least 12 hours.

The treatment composition 4 is then cooled and stabilized between 19 and 21° C. during the dipping phase and also kept under magnetic stirring.

The molybdenum or molybdenum alloy part 2 is introduced into the treatment composition 4 at a speed of 50 mm/min, held for 30 seconds in the formulation and then exited at a speed of 10 mm/min.

When the part 2 is fully emerged from the formulation, it is dried with hot air (150-220° C.) until the solvent evaporates and allows the handling of the coated part 2.

The part 2 thus coated is cross-linked under air, 1 hour at 200° C. before a second dipping in a more diluted formulation in order to obtain a covering deposit and plug any porosity after the first coating step 3. The solvent content by mass in the more diluted formulation will be increased between 5 and 15% relative to the initial formulation, for example from 53 wt. % to 60 wt. %.

A second example of the treatment composition 4 contains:
  A mass proportion comprised between 40% and 70% of Terpineol solvent, preferentially between 50% and 65%, for example 50%,
  A mass proportion comprised between 15% and 40% of SILRES MK® (polysiloxane preceramic polymer, having a theoretical conversion rate of ceramic to silicon dioxide $SiO_2$ or to silicon oxycarbide Si—O—C of 80% by mass), preferentially between 20% and 35%, for example 25%,
  A mass proportion comprised between 10% and 35% of silicon, for example 25% by mass and a grain size of less than 20 microns, preferentially less than 10 microns.

Another example of the treatment composition 4 comprises, based on the total mass of the suspension:
  A mass proportion comprised between 30% and 70% of a solvent, preferentially between 35% and 45%
  A mass proportion comprised between 15% and 40%, preferentially between 15% and 25%, of polysiloxane preceramic polymer, having a theoretical conversion rate from ceramic to silicon dioxide $SiO_2$ or to silicon oxycarbide Si—O—C of 80% by mass,
  A mass proportion comprised between 15% and 60% of aluminum, preferentially between 35% and 50%, for example 44.5% by mass and a particle size of less than 20 microns, preferentially less than 10 microns.

Such a composition improves the protective power of the coating formed after heat treatment.

This makes it possible for example to produce a refractory alloy mechanical part with a continuous reactive layer with a Molybdenum Silicon Aluminum Mo(Si,Al)2 alloy phase capable of generating a protective alumina layer when subjected to oxidizing conditions, thus protecting the part from further oxidation.

The preparation of the treatment composition 4 according to the second composition example and the dip coating 3 are carried out under the same conditions as for the first composition example (speed, temperature).

After a first coating 3, the part is dried with hot air (150-220° C.) and then air cross-linked for 1 hour at a temperature comprised between 170 and 230° C., for example 200° C.

If necessary, additional dipping/drying/cross-linking steps can be added with the second formulation to obtain a covering deposit depending on the complexity of the parts to be coated. In this way, any cracks in a first coating layer will be filled by an additional coating layer, thus producing a crack-free coating.

The heat treatment 5 should lead to the ceramization of the SILRES MK® and to the sintering of the silica contained in the coating 6 in the case where the filler incorporated in the composition 4 is a silica passive filler (first example). If the filler incorporated in the composition 4 is a silicon active filler (second example), the heat treatment must allow the solid state interdiffusion of the silicon into the molybdenum support or molybdenum base to form a molybdenum silicide (molybdenum-silicon alloy). In either case, the heat treatments can optionally be carried out during the same heat cycle in an alumina tube furnace under argon sweeping at a flow rate of 35 to 40 L/h.

In particular, this reduces the number of steps in the process and thus reduces its duration and therefore its cost.

In this example, the heat cycle imposed on the coated part 2 has increasing and decreasing temperature ramps of 200° C./hour and a 25-hour plateau at 1350° C. for the composition 4 comprising a fine silica passive filler and a 10-hour plateau at 1250° C. for the composition 4 comprising a silicon active filler.

In this way, the part 2 is covered with a coating 6 configured to protect the part from oxidation and interdiffusion phenomena when the part 2 is in contact with a body containing species likely to diffuse into the substrate 7, and vice versa.

This effect is particularly advantageous for refractory alloy foundry cores, in particular those used for the foundry manufacture of superalloy gas turbine blades. Interdiffusion of species between the core and the superalloy is prevented by the all-ceramic coating 6 in example 1 and metal/ceramic (silicide+silicon oxycarbide) coating 6 in example 2, and oxidation of the core is also limited by the coating 6.

The invention claimed is:

1. A process for coating a refractory alloy part, the process comprising:
  coating at least one area of a refractory alloy part by a treatment composition, the treatment composition comprising at least one type of preceramic polymer and a solvent, and
  heat treating the refractory alloy part coated with the treatment composition, the heat treating being configured to at least partially convert the preceramic polymer and form a ceramic coating obtained by conversion, the ceramic coating being configured to protect the refractory alloy from oxidation,
  wherein the treatment composition also comprises active fillers configured to migrate by diffusion to the refractory alloy part during the heat treatment, the active fillers being configured to form an alloy coating on a surface of the refractory alloy part, and the alloy coating being located between the refractory alloy part and the ceramic coating obtained by conversion, and
  the alloy coating being configured to generate a protective oxide layer when subjected to oxidizing conditions.

2. The process as claimed in claim 1, comprising removing the ceramic coating obtained by conversion by mechanical or chemical action to leave only the alloy coating.

3. The process as claimed in claim 1, wherein the treatment composition further comprises passive fillers configured to modulate a coefficient of expansion of the ceramic coating so as to exhibit a difference between a coefficient of expansion of a substrate and the coefficient of expansion of the ceramic coating of less than $3*10^{-6}$ $K^{-1}$.

4. The process as claimed in claim 1, wherein the ceramic coating comprises at least a first coating step and a second consecutive coating step, and at least one cross-linking step carried out between the first coating step and the second coating steps, the cross-linking step being configured to generate an infusible polymer network capable of supporting subsequent pyrolysis steps, and the second coating step being applied to obtain a layer thicker than the first coating step.

5. The process as claimed in claim 4, wherein a treatment composition used in the second coating step has a lower viscosity than a viscosity of a treatment composition used during the first coating step.

6. The process as claimed in claim 4, wherein the cross-linking step is carried out in the presence of air at a temperature greater than or equal to a highest cross-linking temperature among different cross-linking temperatures of different preceramic polymer species of the treatment solution.

7. The process as claimed in claim 1, wherein the refractory alloy comprises molybdenum, and wherein the ceramic coating is configured to protect the refractory alloy from a diffusion phenomena.

8. The process as claimed in claim 1, wherein the heat treatment step comprises:

cross-linking at a first temperature configured to evaporate the solvent and accelerate cross-linking;

conversion carried out at a second temperature configured to convert the preceramic polymer to ceramic and remove organic species, so as to obtain a ceramic with an amorphous structure; and structuring carried out at a third temperature, configured to convert the ceramic with an amorphous structure to ceramic having a crystalline structure.

9. The process as claimed in claim 1, wherein the process comprises at least a first coating step and a second coating steps and a ceramization step carried out between the first coating step and the second coating steps, the second coating step being configured to fill or heal defects and porosity that may be generated by the ceramization step.

10. The process as claimed in claim 1, wherein the heat treating step is carried out under a controlled atmosphere so as to avoid oxidation of a foundry core while having an oxygen partial pressure sufficient to ensure the conversion of the preceramic polymer to an oxycarbide ceramic or oxide ceramic.

11. The process as claimed in claim 1, wherein the treatment composition comprises, based on a total weight of the treatment composition:

a mass proportion comprised between 45% and 70% of the solvent, a mass proportion comprised between 15% and 40% of the preceramic polymer, a mass proportion comprised between 10% and 30% of a passive filler.

12. The process as claimed in claim 1, wherein the treatment composition comprises, based on a total weight of the treatment composition:

a mass proportion comprised between 30% and 70% of the solvent, a mass proportion comprised between 15% and 40% of a polysiloxane preceramic polymer, having a theoretical conversion rate from ceramic to silicon dioxide, and a mass proportion comprised between 15% and 60% of aluminum with a grain size of less than 20 microns.

13. The process as claimed in claim 1, wherein the refractory alloy part is a refractory alloy mechanical part.

14. The process as claimed in claim 1, wherein the refractory alloy part is a refractory alloy foundry core.

* * * * *